United States Patent [19]

Berardo

[11] Patent Number: 4,639,001
[45] Date of Patent: Jan. 27, 1987

[54] SELF-CENTERING CHUCK WITH ADJUSTABLE AND REPLACEABLE JAWS

[75] Inventor: Giuseppe Berardo, Turin, Italy

[73] Assignee: Mario Pinto S.p.A., Turin, Italy

[21] Appl. No.: 660,181

[22] Filed: Oct. 12, 1984

[30] Foreign Application Priority Data

Oct. 13, 1983 [IT] Italy .................. 68056 A/83

[51] Int. Cl.$^4$ .................................... B23B 31/16
[52] U.S. Cl. ................................ 279/121; 279/123
[58] Field of Search ............. 279/1 L, 123, 110, 1 B, 279/1 SJ, 121

[56] References Cited

U.S. PATENT DOCUMENTS 4,243,237 1/1981 Röhm ........................ 279/110 X

FOREIGN PATENT DOCUMENTS 2949566 6/1981 Fed. Rep. of Germany ...... 279/123

Primary Examiner—Z. R. Bilinsky
Attorney, Agent, or Firm—Sughrue, Mion, Zinn, Macpeak & Seas

[57] ABSTRACT

A self-centering chuck with adjustable and replaceable jaws includes false jaws which are slidable radially in corresponding recesses in an annular body of the chuck through the action of a rod coaxial with the chuck itself. The jaws, each of which has tangential teeth facing the corresponding false jaw, are also slidable in the recesses. In each of the false jaws is mounted a peg slidable parallel to the axis of the chuck. The peg has teeth for engagement with a respective jaw. Each peg has a transverse groove facing radially outwardly of the chuck. This groove is engaged by an eccentric which is rotatable in the false jaw about a radial axis parallel to the direction of sliding of the false jaw. This eccentric has a formation engageable by a key or similar operating tool for rotating it in order to disengage and re-engage the peg relative to the corresponding jaw.

8 Claims, 4 Drawing Figures

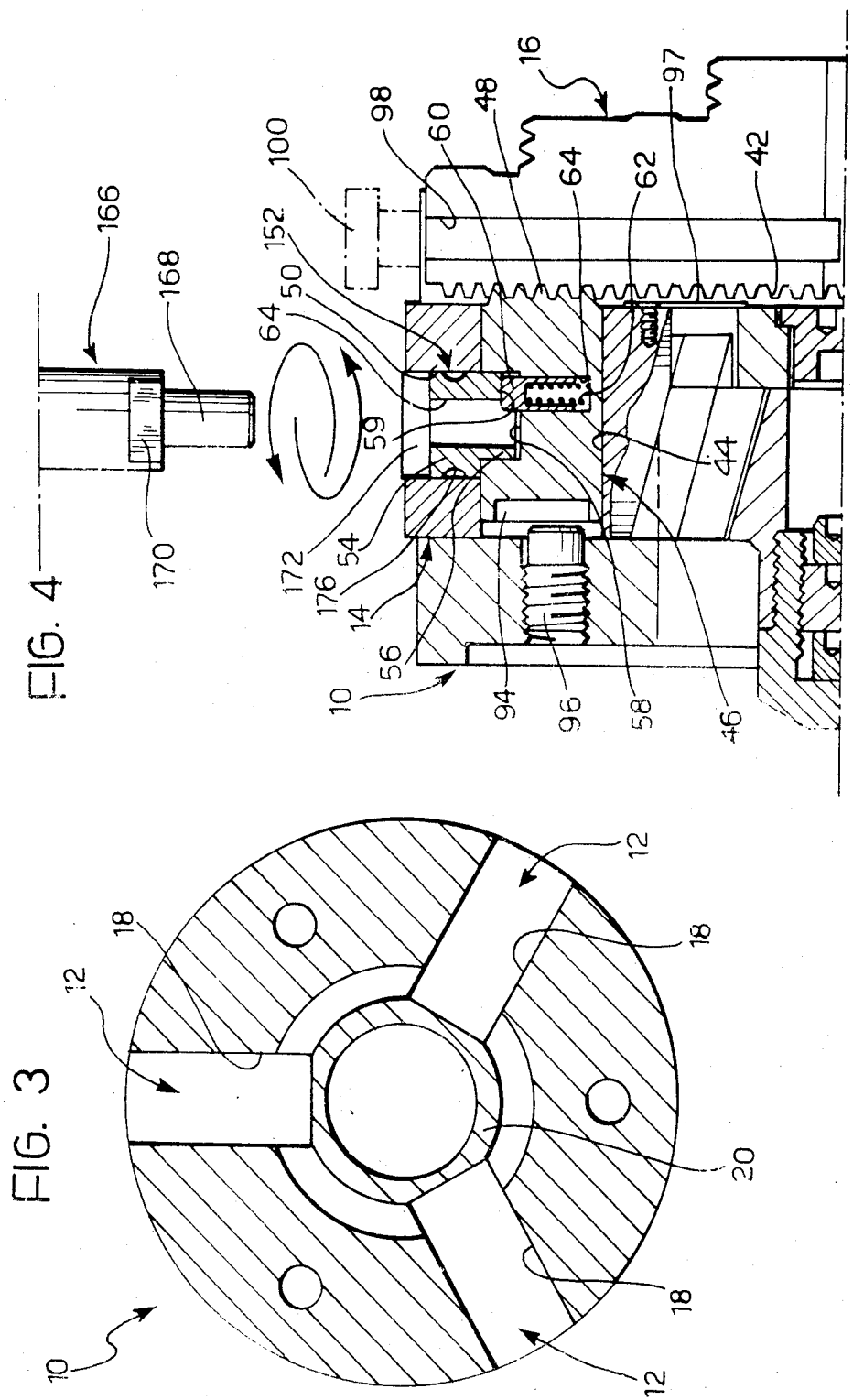

SELF-CENTERING CHUCK WITH ADJUSTABLE AND REPLACEABLE JAWS

BACKGROUND OF THE INVENTION

The present invention relates to a self-centering chuck of the type comprising false jaws slidable radially in corresponding recesses in an annular body of the chuck under the action of a rod coaxial with the chuck, jaws also slidable in the recesses and radially removable therefrom, which project from the frontal face of the chuck body and each have tangential teeth facing the corresponding false jaw, pegs movable parallel to the axis of the chuck in respective cavities in each of the false jaws and each having teeth engageable with a respective jaw, and means for moving the pegs from outside the chuck body by means of a key or similar tool, for the purpose of disengaging and re-engaging the pegs relative to the jaws.

Throughout the present description and in the claims, terms such as "radial", "axial", "longitudinal" and the like are intended to refer to the axis of the chuck, unless otherwise indicated.

DESCRIPTION OF THE PRIOR ART

Self-centering chucks of the type considered permit the jaws to be replaced and inverted manually or automatically by the disengagement of the pegs from the jaws. When the pegs are disengaged, the jaws can in fact be withdrawn radially from the recesses in the body of the chuck and reinserted in the same recesses.

Another advantage offered by certain types of chuck resides in the possibility of adjusting the radial position of the jaws according to the diameter of the piece to be held. The movement of the jaws by the action of the rod, which cooperates with the false jaws by means of ramps or cams, causes the travel of the false jaws to be limited to only a few millimeters, since, to obtain the irreversibility of the drive, the ramps should be slightly inclined relative to the axis of the chuck. With jaws fixed to the false jaws, therefore, the chuck would be suitable for a very restricted range of diameters. Due to the toothed engagement between the jaws and the pegs, it is possible instead to displace radially the limits of travel of the jaws by distances corresponding to the pitch of the teeth.

Chucks of the aforesaid types are known in which the means for operating the pegs are either rather complicated and costly or fail to afford total security against the accidental disengagement of the jaws during rotation.

In a chuck known from the art closest to the invention, each false jaw is associated with a cylinder which is rotatable and slidable, within a jacket, on an axis tangential to the body of the chuck. At its outer end, the cylinder has a hexagonal seat in which the hexagonal shank of a key, which has a biconical annular groove, can be engaged. At the inner end of the cylinder are found, in sequence, a groove and a ramped nib. The groove is engaged by an extension of a slider slidable transversely in the false jaw behind the peg. This slider also has a ramp, which is followed by a projection serving as a stop. The peg has two ramps for cooperating with those of the ramped nib and the slider, respectively.

When the peg is engaged with the jaw, the cylinder is in a withdrawn position relative to the peg, and the projection of the slider bears against the back of the peg to prevent its disengagement from the jaw. The cylinder is then turned through 90° from the position in which the ramp of its nib can be engaged with that of the peg and one of its lateral pins is engaged in a recess in the jacket to prevent it from sliding. In this position, a ball is housed in an aperture opening into the hexagonal seat, and in a cavity in the jacket. In order to disengage the jaw, the key is inserted into the hexagonal seat and the cylinder is rotated through 90° to disengage the pin from the recess. With this rotation, the ball is made to leave the cavity in the jacket and engage the biconical groove in the shank of the key. The ball still remains captive in the aperture and prevents the removal of the key. The cylinder is then thrust forward by means of the key. This movement displaces the slider, separating the projection thereof from the back of the peg to permit the withdrawal of the latter, and this withdrawal is effected by the cooperation of the ramp of the nib with the corresponding ramp of the peg.

In order to re-engage the jaw, the key is turned back and, by means of the ball, draws back the cylinder and the slider. The ramp of the latter, which cooperates with the corresponding ramp of the peg, thrusts the peg back into the position of engagement with the jaw. Prior to completion of the withdrawal movement, the projection of the slider re-positions itself against the back of the peg to lock it in the engaged position. In order to remove the key, it is rotated through 90° in the opposite direction to the foregoing, together with the cylinder, whereupon the ball leaves the biconical groove and re-enters the cavity of the jacket.

In the case of manual changing and adjustment of the jaws, the same key is then used in association with an electrical master switch of the machine tool. To turn off the switch, the key is inserted and turned into a position from which it cannot be removed. With this arrangement, the machine is fully secured against the possibility of its being started until it has been verified that all the jaws have been engaged by the pegs and the key has been removed from the chuck.

The chuck considered above, therefore, has the advantage of complete safety from the point of view of accident prevention, as well as affording the possibility of manual or automatic changing and adjustment of the jaws.

However, this presents some disadvantages:

the system for operating the pegs comprises numerous parts, some of which are of a complex, and hence costly, nature;

as a result of the complexity of the system for moving the pegs, it is necessary to make the body of the chuck in two parts, that is with an actual body and a rear cover, whether to permit the making of the various seats in the body for the members of the operating system, or to permit the assembly of these members; from this point of view also, the chuck is costly;

the operating system for the pegs lends itself well to the manual adjustment and changing of the jaws, but it gives rise to a certain complication with regard to the automatic changing of the jaws, since it necessitates a somewhat complex replacement mechanism with a key that is movable perpendicularly to the movement of the tool for changing the jaws, whilst, for the simplicity of the mechanism, it is preferable for the movement of the key to be parallel to the direction of movement of the changing tool.

Another known chuck from the category considered lends itself well to the automatic changing of the jaws, since, for the operation of the pegs, it requires a simple pusher acting in the direction of movement of the changing tool.

In this other known chuck, the means for operating the pegs comprise, for each peg, a slider movable radially within the body of the chuck, that is, perpendicular to the direction of movement of the peg, and urged radially outwardly by a spring. One end of the slider is accessible at the periphery of the chuck body in the form of a push-button.

This push-button can receive a thrust from the pusher of the changing mechanism, or a manual thrust. The slider and the peg have ramps or cams which cooperate with each other in a positive manner. When the push-button is pressed, the peg is disengaged from the jaw. When the push-button is released, the peg reengages the jaw by the action of the biassing spring of the slider. With a system of this type, there is a risk that the release of the push-button may not be followed by the re-engagement of the peg with the jaw due to the jamming of the ramp system or the breakage of the spring. Under these conditions, the jaws are free to emerge from the chuck body through centrifugal force when the chuck is rotated. The only possibility of checking that the jaws have been re-engaged lies in the visible indication provided by the push-button in a projecting position on the periphery of the chuck body. This check is left to the trained operator of the machine, who may fail to carry it out.

SUMMARY OF THE INVENTION

The object of the present invention is that of realising a chuck of the type mentioned initially, which is more economical than the known chucks of the same category, including, in particular, a system for the operation of the pegs which is composed of a small number of simple parts that are of a type to lend themselves to manual or automatic changing and adjustment of the jaws, and to afford complete security against the accidental disengagement of the jaws and, in the case of manual operation, against the removal of the key if the jaws are not engaged.

According to the present invention, this object is achieved by means of a self-centering chuck of the type mentioned initially, characterised in that each peg has a transverse groove facing radially outwardly of the chuck, and the moving means comprise, for each peg, an eccentric which is rotatable in the false jaw about a radial axis parallel to the direction of sliding of this false jaw and is engaged in the groove, the eccentric having a formation engageable positively by the key or like tool to rotate it.

By virtue of this proposed solution, the control means for each jaw are reduced essentially to the part comprising the eccentric, which can be a part of relatively simple form, while, for its coupling with the eccentric, each peg requires a simple transverse groove which can be produced, for example, by means of milling and subsequent grinding. This system lends itself to the production of the chuck body in a single piece in which are formed the recesses for the false jaws and the jaws, as well as other smaller seats, all of which can be formed from outside the chuck body. The seats for the pegs and the eccentrics are, however, formed in the false jaws, and the pegs and eccentrics may be inserted into these seats before the false jaws are inserted into the recesses.

Preferably, each eccentric has the form of a bush with a through hole centered on its axis and a notch in its end which is radially internal of the body of the chuck; in the condition corresponding to the engagement of the peg with the jaw, this notch cooperates with a locking pawl which is inserted in the peg and is subject to the action of a spring, and has a part which projects into the hole in the bush; the key or like tool has a tang which can be inserted into the hole of the bush to push back the pawl and disengage it from the notch, so as to allow the bush to rotate and disengage the peg from the jaw.

Due to this arrangement, full assurance can be obtained that the eccentric remains locked in the orientation required for the engagement of the peg with the jaw. This assurance is sufficient in the case of automatic changing of the jaws, since the changing mechanisms are equipped with a safety switch the turning-off of which is verified only if the key used to operate the eccentric is in the angular position corresponding to the locking of the jaws. Furthermore, couplings in the form of a key-eccentric-peg kinematic chain, ensure the dual correspondence between the angular positions of the key and the linear positions of the peg. In this way, if jamming of the peg or the eccentric occurs (which is improbable, given the simplicity of the parts and their coupling), the key cannot return to the angular position corresponding to closure of the safety switch.

According to an embodiment adapted for manual adjustment, inversion and changing of the jaws, the radially external end of the eccentric has a seat of a form that is asymmetrical with respect to the axis of rotation of the eccentric itself, the said end is covered by a plate having an aperture of an asymmetric form corresponding to that of the seat and with which the latter is aligned when the eccentric is orientated in the position corresponding to the engagement of the peg with the jaw, and the key or like tool has a corresponding asymmetric peripheral formation which can be inserted into the seat through the aperture in the plate, this plate preventing the peripheral formation of the key from being removed from the seat in all the orientation positions of the eccentric apart from that corresponding to the aforesaid alignment.

This solution, as well as ensuring by simple means that it is impossible to remove the key when the peg is not engaged with the false jaw, permits the key to be used to turn the master switch of the machine on and off, as in the prior art.

In this case, the rotary operating member of the switch will have a seat of the same form as that of the eccentric, which will be covered by a plate with an aperture of the same shape as that of the plate covering the eccentric. The arrangement will be such as to permit the removal of the key from the switch only if the latter is turned on.

BRIEF DESCRIPTION OF THE DRAWINGS

Further characteristics and advantages of the invention will become apparent from the detailed description which follows with reference to the appended drawings, provided by way of non-limiting example, in which:

FIG. 3 is a cross-section taken on the plane III—III of FIG. 1, on a reduced scale, and FIG. 4 is a partial section, similar to FIG. 1, showing a variant adapted for the automatic replacement of the jaws.

DETAILED DESCRIPTION OF THE PREFERRED EMBODIMENTS

Figure 1:
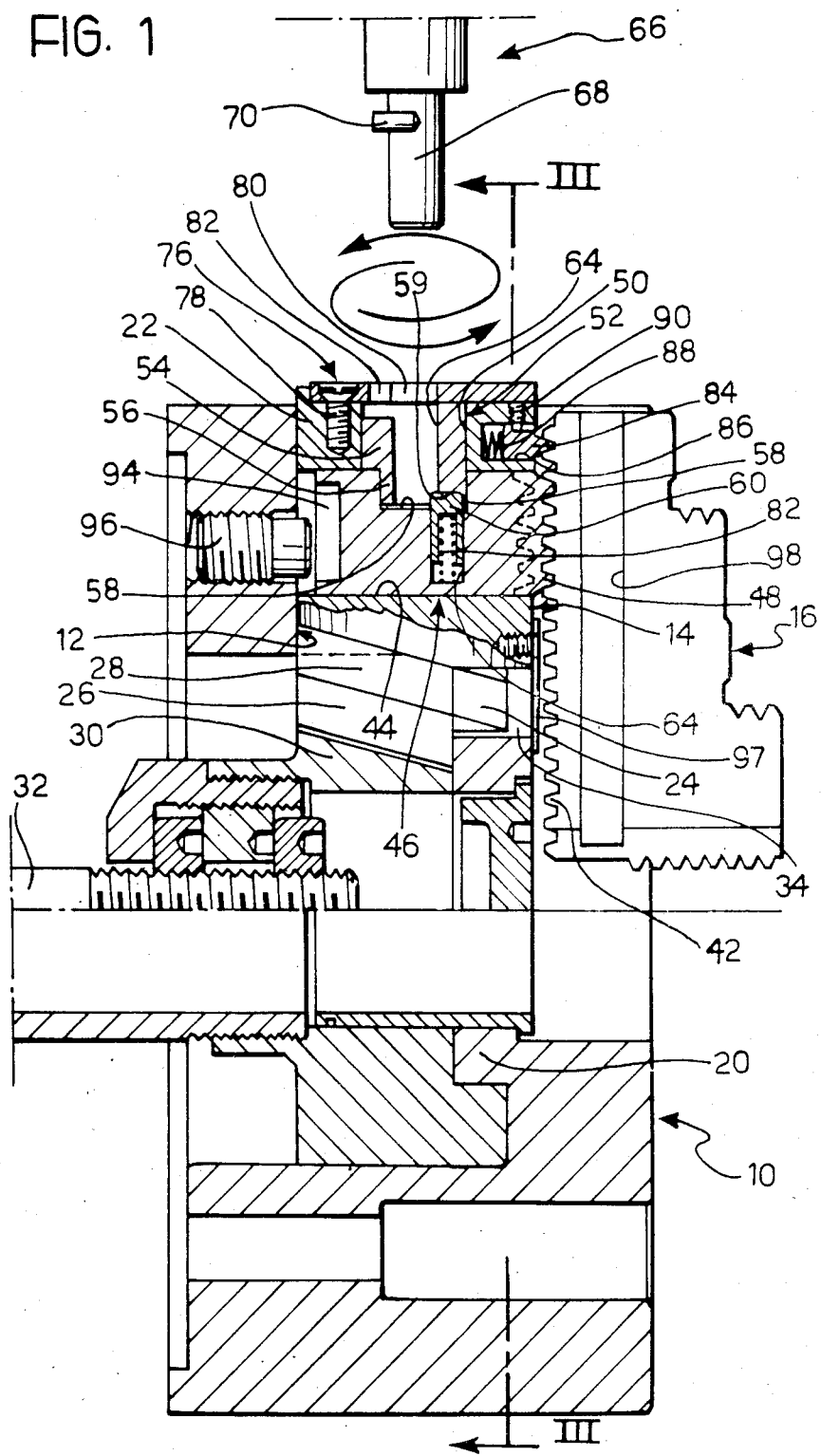
FIG. 1 is a diametric section of a chuck according to one embodiment of the invention adapted for the manual adjustment, inversion and replacement of the jaws, in which a key for operating the blocks is shown partially in elevation.
Figure 2:
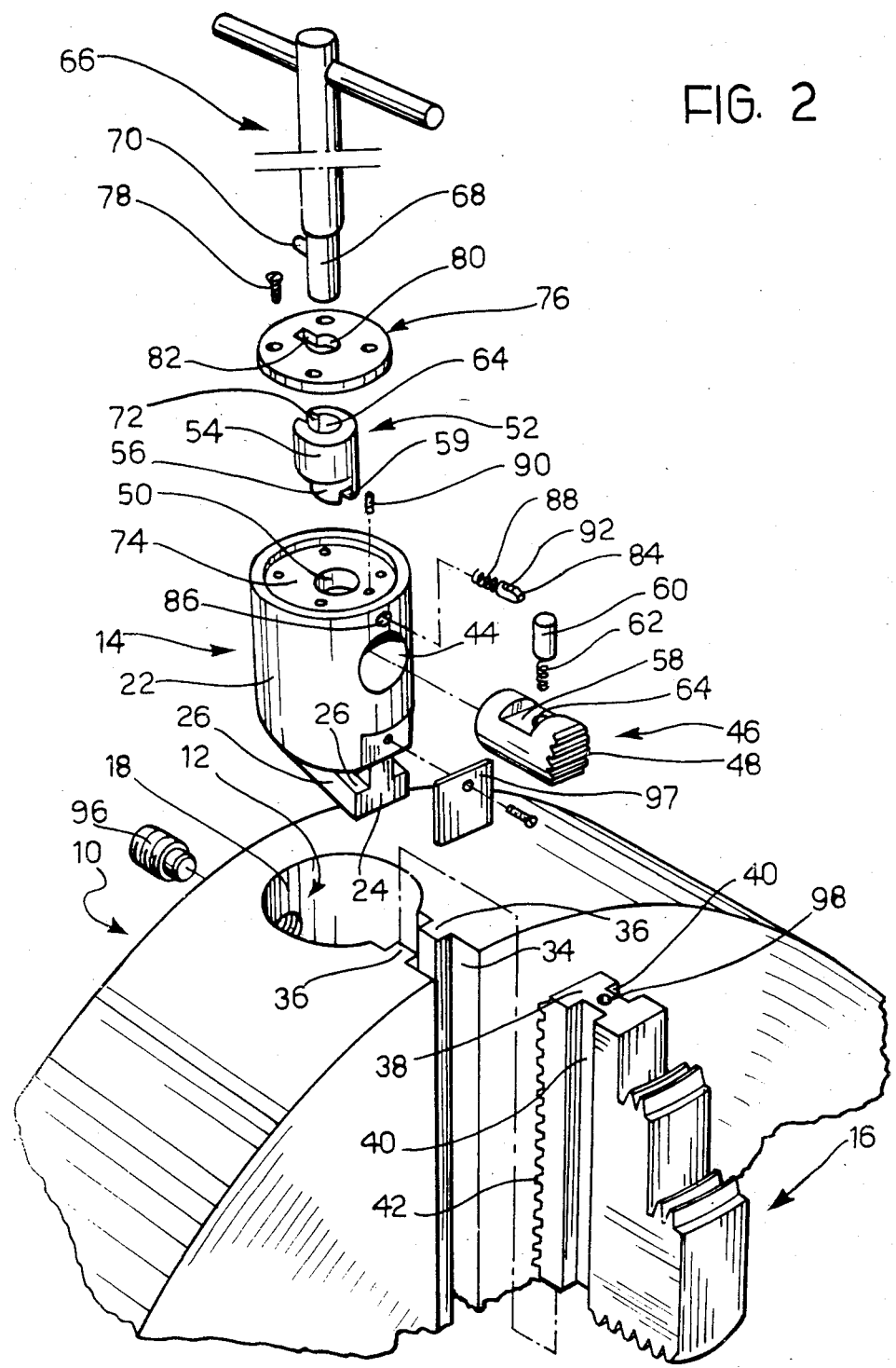
FIG. 2 is an exploded partial perspective view of the chuck of FIG. 1.

Referring to FIGS. 1 to 3, a chuck comprising an annular one-piece body is generally indicated 10.

Within the body 10 are formed radial recesses 12 for the sliding of false jaws 14 and jaws 16.

FIG. 3 shows a standard arrangement with three recesses 12 for receiving a corresponding number of pairs of false jaws 14 and jaws 16, it being understood, however, that the chuck may be of the type with two jaws, four jaws, etc.

Advantageously, the recesses 12 include a part 18 bored out to a generally cylindrical shape. The body 10 includes an internal annular part 20 in the form of a collar. As can be observed in FIG. 3 in particular, the cylindrical recess parts 18 are formed in the direction of the axis of the chuck to a depth such as to leave the collar 20 substantially complete so that it thus serves to strengthen the finished body of the chuck.

As can be seen particularly in FIG. 2, each of the false jaws 14 comprises a part 22 in the form of a cylindrical piston, which is ground to a diameter such as to fit into the recess part 18 with a precise sliding coupling.

Each false jaw 14 has, at its radially internal end, a T-sectioned heel 24 with a development inclined to the axis of the chuck in such a way as to define a pair of ramps or cams 26. These ramps 26 are engaged with corresponding ramps 28 formed on a head 30 of a control rod 32 coaxial with the chuck 10. The rod 32 is connected to the piston rod of a linear actuator so as to cause, with its displacement towards the left (in FIG. 1), a centripetal movement of the false jaws 14 and, with its displacement towards the right (in FIG. 1), a centrifugal movement of the false jaws.

Each recess 12 also has a guide part 34 which is parallel to the part 18 and puts this part 18 into communication with the frontal face of the chuck body 10. The part 34 has two parallel tenons 36 on its sides.

Each jaw 16 has a heel 38 engaged in the guide part 34, with two mortices 40 in which the tenons 36 are engaged.

The part 34 of each recess 12 also opens without obstruction onto the periphery of the chuck body 10, so as to allow the respective jaw 16 to project radially from this body and be removed.

Each jaw 16 has tangential teeth 42 on its dorsal face facing the respective false jaw 14.

In the cylindrical part 22 of each false jaw is formed a generally cylindrical cavity 44 the axis of which is parallel to the axis of the chuck. A peg 46 with a generally cylindrical shape corresponding to the cavity 44 is mounted slidably in the cavity 44. The peg 46 has, at its end facing the jaw 16, teeth 48 which are complementary to the teeth 42.

Each false jaw 14 also has a cylindrical seat 50 the axis of which coincides with that of the cylindrical part 22, and which opens out at the end of the latter which is radially external with regard to the axis of the chuck. An eccentric in the form of a bush 52 is mounted in the cavity 50. The bush 52 comprises a coaxial cylindrical part 54 rotatable in the cavity 50, and a cylindrical eccentric part 56 or eccentric in the strict sense of the word.

Each peg 46 has a transverse groove 58 whose width in the axial direction of the peg corresponds to the diameter of the eccentric part 56 which is engaged in the groove 58.

A notch 59 is formed in that end of the bush 52 located radially inwardly of the chuck body. The peg 46 is provided with a pawl 60 in the form of a small piston loaded by a spring 62 and mounted, with this spring, in a blind hole 64 formed in the peg at the bottom of the groove 58, that is, parallel to the axis of the bush 52. The piston or pawl 60 is thus positioned so that one of its parts projects laterally into the coaxial cylindrical hole 64 of the bush 52, as shown in FIG. 1.

As will be understood, the arrangement is such that a rotation of the bush 52 through 180° causes a translation of the peg 46 from a position in which its teeth 48 are engaged with the teeth 42 of the jaw 16 to a position (in broken outline in FIG. 1) in which the teeth 48 are disengaged from the teeth 42.

The arrangement is also such that, when the peg 46 is engaged with the jaw 16, the pawl 60 is engaged in the notch 59 and prevents the rotation of the bush 52.

As will be understood, when the peg 46 is engaged with the jaw 16, the latter is made rigid with the false jaw 14 in its centrifugal and centripetal movements. A key, generally indicated 66, is used to permit the replacement of the jaws 16, their inversion, or the adjustment of their position in relation to the false jaws 14. The key 66 includes a cylindrical tang 68 with a diameter corresponding to that of the hole 64 in the bush 52. A lateral appendage 70 constituted by a pin or the like projects from the tang 68.

The bush 52 has, at its end which is radially external with respect to the axis of the chuck, a slot 72 which extends laterally from the mouth of the cavity or hole 64.

The radially external end of each false jaw 14 has an annular recess or seat 74 which houses a circular plate 76 retained by screws 78.

The plate 76 has a central aperture 80 in the form of a circular hole with a lateral notch 82. The hole 80 has the same diameter and the same axis as the hole 64. The slot 72 coincides with the notch 82, when the bush 52 is orientated in the position corresponding to the engagement of the peg 46 with the jaw 16.

In order to disengage the peg 46 from the jaw 16, the tang 68 is fully inserted into the hole 64 through the hole 80, so as to engage the appendage 70 in the slot 72 after the appendage has passed through the notch 82. The length of the tang 68 is such as to push the pawl 60 back against the force exerted by its spring 62 and disengage it from the notch 59. One turn of the key 66 through 180° then causes a corresponding rotation of the bush 52, with the dis-engagement of the peg 46 from the jaw 16. For all orientations of the key 66 and the bush 52 other than that in which the slot 72 coincides with the notch 82, the appendage 70 is positioned beneath the covering plate 76 and the key 66 cannot be removed.

After a jaw 16 has been released by means of the operation described above, it is possible to remove it radially from the chuck and either replace or invert it, or adjust its radial position relative to the false jaw 14 in steps. The positional adjustment is facilitated by means of a tooth 84 slidable parallel to the peg 46 in a corresponding blind hole 86 in the false jaw 14 and urged by a spring 88. The possible loss of the tooth 84 is prevented by means of a threaded dowel 90 which is screwed onto the false jaw 14 through the bottom of the seat 74 beneath the cover 76. This dowel is engaged in a groove 92 in the tooth 84.

As will be understood, the tooth 84 constitutes a so-called catch which defines each possible position of engagement of the teeth 48 of the peg 46 with the teeth 42 of the jaw 16.

In order to lock the jaw 16 to the false jaw 14 again, the key 66 is turned in the opposite direction to previously, until the appendage 70 and the slot 72 are aligned with the notch 82. When this angular position has been reached, the teeth 48 are fully engaged with the teeth 42. This engagement is ensured by the engagement of the tooth 84 with the teeth 42.

At this point, the key 66 can be removed due to the alignment of the appendage 70 with the notch 82. The removal of the tang 68 from the hole 64 permits the small piston or pawl 60 to be re-engaged in the notch 59, thus locking the bush 52 and the peg 46 in the position of engagement of the jaw 16.

The disengaged key 66 may be inserted into the operating member of a master switch of the machine tool, which has a cylindrical seat for receiving the tang 68, a slot comparable with the slot 72, and a cover plate comparable with the plate 76, with a hole and notch comparable with the hole 80 and notch 82 respectively.

Naturally, the arrangements for coupling of the key with the bush or eccentric may differ from those illustrated and described above. The essential conditions are that the radially external end of the eccentric should have a seat of a form that is asymmetric with respect to the rotation axis of the eccentric, that this end should be covered by a plate having an aperture of an asymmetric form corresponding to that of the seat and with which the latter should be aligned when the eccentric is orientated in the position corresponding to the engagement of the peg with the jaw, and, finally, that the key or similar tool should be provided with a correspondingly asymmetric peripheral formation which can be inserted in the seat through the aperture in the plate.

Naturally, the above also applies to the master switch of the machine tool.

The chuck illustrated in FIGS. 1 to 3 is completed by other details which will be described briefly.

A diametral groove 94 is formed in the end of the peg 46 opposite that with the teeth 48. A threaded dowel 96 is screwed frontally into this groove from the rear face of the chuck body 10. The groove 94 serves to allow the withdrawal of the peg 46 notwithstanding the presence of the dowel 96. The dowel 96 has the function of preventing the violent ejection of the false jaw 14 and corresponding jaw 16 by centrifugal force in the event of breakage of the head 30, the heel 24, or other control member.

The false jaw 14 carries a small plate 98 which covers the end of the heel 24 facing the jaw 16. This plate 98 serves to protect the zone of the heel 24 from the entry of any extraneous matter.

Reference will now be made to FIG. 4, in order to describe a variant of the chuck suitable for automatic replacement of the jaws.

The parts of FIG. 4 identical to those of FIG. 1 are indicated by the same reference numerals and will not be described.

The parts which differ from those of FIG. 1 are indicated, wherever possible, by the same reference numerals increased by 100.

In FIG. 4, each jaw 16 has a hole 98 in a radial position relative to the axis of the chuck. This hole 98 is also present in the jaws 16 of FIGS. 1 and 2, for purposes of standardisation.

The hole 98 allows the insertion of a member 100 for transporting the jaws, forming part of a changing mechanism, not illustrated.

Forming a part of the same mechanism is a key 166 the movement of which is parallel to that of the member 100, that is, radial with respect to the axis of the chuck. The key 166 has a tang 168 comparable to the tang 68 of FIG. 1. Two opposing parallel faces, one of which is indicated 170, are formed on the shank of the key 166 at the root of the tang 168.

The bush or eccentric 152 has, on its face which is radially external with respect to the axis of the chuck, a slot 172 designed to receive the faceted part 170 of the key 166.

In the variant illustrated in FIG. 4, the cover plate 76 is absent, since the master switch of the machine tool is incorporated in the mechanism for changing the jaws and is sensitive to the angular position of the key 166.

The bush 152 is retained within the false jaw 14 by means of a pin (not illustrated) inserted tangentially in a groove 176.

As in the embodiment of FIGS. 1 to 3, the tang 168 has the function of pushing back the small piston pawl 60, so as to permit the rotation of the bush 152 upon operation of the key 166 engaged with its faceted part 170 in the slot 172.

In the variant of FIG. 4, the tooth or catch 84 is absent, since the precise alignment of the teeth 42, 48 is achieved by the jaw-changing device.

I claim:

1. A self-centering chuck of the type comprising:
    an annular body having a frontal face and defining radial recesses;
    respective false jaws slidable radially in said recesses and each defining a respective cavity parallel to the axis of the chuck;
    a rod coaxial with the chuck and operable to effect sliding of the false jaws;
    respective jaws also slidable in said recesses and radially removable therefrom each jaw projecting from the frontal face of the chuck body and having tangential teeth facing the respective false jaw;
    respective pegs slidable parallel to the axis of the chuck in the cavities of the false jaws irrespective of the radial position of said false jaws and each having teeth engageable with the teeth of a respective jaw, and
    key operated means, operable from outside the chuck body, for moving the pegs selectively to disengage and reengage the pegs in relation to the respective jaws,
    wherein the improvement consists in each peg having a transverse groove facing radially outwardly of the chuck, and the moving means comprising, for each peg, a respective eccentric rotatable within the respective false jaw about a radial axis parallel to the direction of sliding of the false jaw and engaged in the groove, said eccentric having a formation engageable positively by the key to rotate it.

2. A chuck as defined in claim 1, wherein each eccentric comprises a bush defining a through hole centered on its axis and a notch in its end which is radially internal with respect to the chuck body, and the respective peg incorporates a spring-loaded locking pawl which cooperates with the notch in the condition in which the peg is engaged with its respective jaw, said pawl having a part which projects into the hole of the bush, and wherein the key has a tang which can be inserted into the hole of the bush to push back the pawl and disengage it from the notch, so as to allow the bush to rotate and disengage the peg from the jaw.

3. A chuck as defined in claim 2, wherein the pawl is in the form of a small piston slidable in the peg parallel to the axis of the bush.

4. A chuck as defined in claim 1, wherein the false jaws and the parts of the recesses in which they are slidable are generally cylindrical.

5. A chuck as defined in claim 1, wherein the pegs and the cavities in which they are slidable are generally cylindrical.

6. A chuck as defined in claim 1, wherein the radially external end of the eccentric has a seat of a form that is asymmetric with respect to the axis of rotation of the eccentric, a plate covers said end and defines an aperture of an asymmetric form corresponding to that of the seat and with which the latter is aligned when the eccentric is orientated in the position corresponding to the engagement of the peg with the jaw, and the key has a corresponding asymmetric peripheral formation which can be inserted in the seat through the aperture in the plate, said plate preventing the peripheral formation of the key from being removed from the seat in all positions of orientation of the eccentric except that corresponding to the alignment.

7. A chuck as defined in claim 6, wherein the asymmetric seat comprises a cylindrical hole centered on the axis of the eccentric and a slot extending laterally from the mouth of said hole, the asymmetric aperture in the plate comprises a circular hole with a lateral notch, and the asymmetric formation of the key comprises a cylindrical tang engageable in the hole and a lateral appendage engageable in the slot.

8. A chuck as defined in claim 1, wherein each false jaw has a spring-loaded tooth slidable parallel to the peg and engageable between the teeth of the corresponding jaw in such a way as to define each possible position of engagement of the teeth of the peg with the teeth of the jaw.

* * * * *